Figure 1:
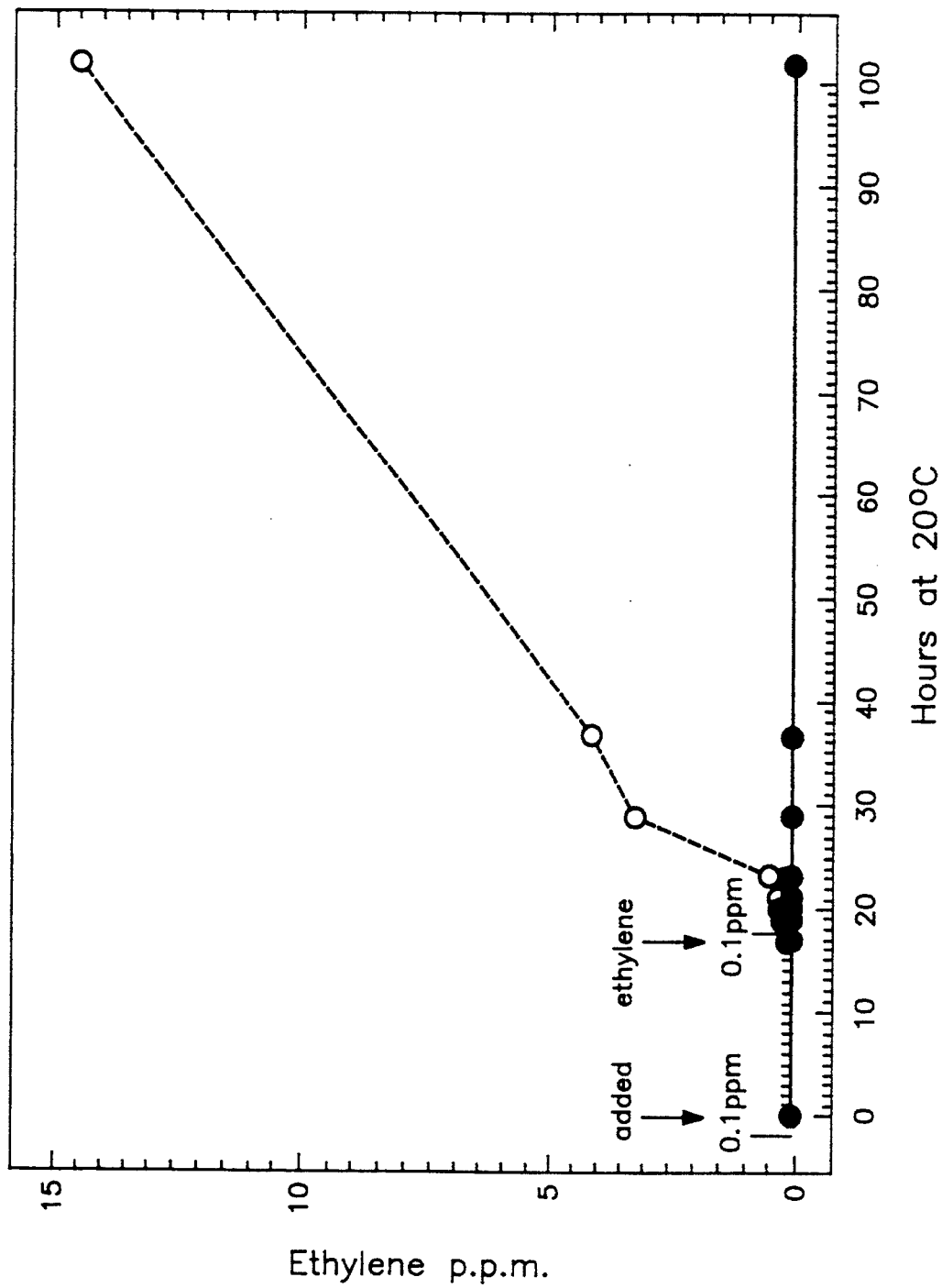

United States Patent [19]

Holland

[11] Patent Number: 5,334,623
[45] Date of Patent: Aug. 2, 1994

[54] ABSORBENT MATERIAL AND USES THEREOF

[75] Inventor: Robert V. Holland, North Ryde, Australia

[73] Assignee: Commonwealth Scientific and Industrial Research Organisation, Campbell, Australia

[21] Appl. No.: 829,020

[22] Filed: Mar. 5, 1992

[30] Foreign Application Priority Data

Sep. 12, 1989 [AU] Australia .................. PJ6333

[51] Int. Cl.$^5$ .................. A23B 7/00; B65B 55/00; C08K 5/3467
[52] U.S. Cl. .................. 523/100; 523/102; 524/100; 426/321; 426/323; 426/331; 426/410; 426/415
[58] Field of Search ............. 523/100, 102; 524/100; 525/333.6, 355; 426/323, 321, 331, 410, 415

[56] References Cited

U.S. PATENT DOCUMENTS

| | | | |
|---|---|---|---|
| 4,021,400 | 5/1977 | McKenna | 523/102 |
| 4,962,142 | 10/1990 | Migdol et al. | 524/100 |

FOREIGN PATENT DOCUMENTS

| | | |
|---|---|---|
| 61449/80 | 2/1981 | Australia . |
| 41509/89 | 3/1990 | Australia . |
| 8900960 | 2/1989 | PCT Int'l Appl. . |

OTHER PUBLICATIONS

"Dihydropyridazine aus Olefinen und 3,6-Dicarbomethoxy-1,2,4,5-tetrazine" by Avram et al. Chem. Ber. 95, 2248-53, 1962.
"Thermal Cycloaddition of Dimethyl 1,2,4,5-Tetrazine-3,6-dicarboxylate with Electron-Rich Olefins", Boger et al. J. Org. Chem. 49, 4405-4409, 1984.
Patents Abstracts of Japan, C-216, p. 94, JP.A. 58-220648 (Toyo Soda Kogyo K.K.) Dec. 22, 1983 the whole abstract.
Patents Abstracts of Japan C-617, p. 71, JP.A. 1-94982 (Sukairaito Kogyo K.K.) Apr. 13, 1989 the whole abstract.
Derwent WPI/L Online Abstract Accession No. 81-22187D, JP.A. 56010458 (Honshu Paper Mfg K.K.) Feb. 2, 1981 the whole abstract.

*Primary Examiner*—Paul R. Michl
*Assistant Examiner*—Tae H. Yoon
*Attorney, Agent, or Firm*—Jacobson, Price, Holman & Stern

[57] ABSTRACT

The present invention provides a composition for absorbing ethylene and other unsaturated compounds. The composition comprises electron-deficient dienes or trienes incorporated in an ethylene-permeable substrate. In a preferred form the composition comprises tetrazine dicarboxyoctyl ester in an ethylene-permeable, hydrophobic polymeric substrate. In a preferred form the composition is cast as a thin film suitable for wrapping and/or packaging. The present invention also provides a method of retarding the ripening or senescence of fruit and other plant material comprising confining the fruit or plant material in an ambient atmosphere subject to the ethylene-absorbing action of a composition comprising an electron-deficient diene or triene incorporated in an ethylene-permeable substrate.

16 Claims, 2 Drawing Sheets

ABSORBENT MATERIAL AND USES THEREOF

The present invention relates to materials for absorbing ethylene and other unsaturated compounds with a particular view to retarding the deterioration of and extending the storage life of fruit and other plant products.

The post-harvest life and quality of many fruits, vegetables and flowers is seriously shortened if they are exposed to trace amounts of the gas ethylene. The levels of ethylene which can affect living plants are very low, for example ethylene concentrations above 100 nl per liter of air will seriously reduce the vase life of carnations, and levels of that order are commonly present in city air from vehicle exhausts, cigarette smoke, refinery gases, fluorescent lights and from ripening of fruits such as apples.

Accordingly, by reducing exposure to ethylene there is an opportunity to improve the shelf life of such products. Unfortunately, most reagents known to be reactive with ethylene are either, as e.g. potassium permanganate, incompatible with foodstuffs or packaging materials, or react only slowly unless heated. The present inventor, however, has identified a group of compounds which react rapidly and irreversibly with ethylene at room temperature, and which have other properties which make them suitable for the purposes of this invention. The compounds in question may be described as electron-deficient dienes or trienes, such as benzenes, pyridines, diazines, triazines and tetrazines having electron-withdrawing substituents; particularly preferred are tetrazines activated by groups such as fluorinated alkyl groups, sulfones and esters, and especially by the dicarboxyoctyl, dicarboxydecyl and dicarboxymethyl ester groups.

Accordingly, in a first aspect the present invention consists in a composition for absorbing gaseous unsaturated compounds comprising an electron-deficient diene or triene incorporated in an ethylene-permeable substrate.

In a second aspect the present invention consists in a method of retarding the ripening or senescence of fruit and other plant material comprising confining the fruit or plant material in an ambient atmosphere subject to the ethylene-absorbing action of a composition comprising an electron-deficient diene or triene incorporated in an ethylene-permeable substrate.

In a preferred embodiment of the present invention the electron-deficient diene or triene is selected from the group consisting of benzene, pyridine, diazine, triazine and tetrazine having an electron withdrawing substituent(s). It is particularly preferred that the electron-deficient diene or triene is a tetrazine activated by groups such as fluorinated alkyl groups, sulfones and esters. It is preferred that the ester is selected from the group consisting of dicarboxyoctyl, dicarboxydecyl and dicarboxymethyl ester groups. At present, it is particularly preferred that the electron-deficient diene or triene is tetrazine dicarboxyoctyl ester.

As stated above, the preferred electron-deficient diene or triene is a tetrazine having electron-withdrawing substituents. Tetrazines may, however, be unstable in the presence of water and would not, therefore, appear to be suited for use in the moist or humid conditions which commonly prevail during the handling and storage of fruit and the like. Accordingly, where the tetrazine is unstable in the presence of water, it is preferred that the ethylene-permeable substrate is hydrophobic. In this situation, it is particularly preferred that the ethylene-permeable substrate is a hydrophobic polymeric material which will not absorb water and does not contain hydroxyl groups. Examples of such materials are silicone polycarbonates, polystyrenes, polyethylenes and polypropylenes. A particularly preferred polymer is the silicone polycarbonate known as PS099, a 50:50 block copolymer of dimethyl siloxane and bisphenol A carbonate which is marketed by Huls America.

The diene may be incorporated into the ethylene-permeable, hydrophobic polymeric material either by chemical binding or by simple solution. Appropriate compositions for, say, a particular variety of fruit or particular environment may be determined by routine experiment. Using the dicarboxyoctyl ester of tetrazine, the concentration would probably be in the range of 0.01–1.0M depending on the particular application.

A particularly advantageous feature of using polymeric substrates such as those mentioned above, is that they may be cast as thin films suitable for wrapping and packaging, thereby allowing the presentation of large surface areas of absorbent to the ethylene-containing atmosphere. Alternatively, the polymer may be formed into coils or other high surface area shapes for inclusion with fruit and the like within an inert container. It is also envisaged that the electron-deficient diene or triene may be included in an ink composition and then be incorporated by printing on the packaging material. The composition of the present invention may also be used in sachets and labels. It is also envisaged that the composition of the present invention may be used for removing ethylene in store rooms by recirculating the air over the composition.

In addition to the compositions of the present invention being useful in reducing the level of ethylene and other unsaturated compounds in the immediate local of their generation, it will be appreciated that in the form of wrapping they will serve to prevent ethylene entering or leaving a package. This may be useful when materials of differing ethylene-generating capacity or ethylene sensitivity are to be stored in close proximity.

A further advantage obtained using the tetrazine dicarboxyoctyl ester is that it has a red color which disappears as the tetrazine is consumed by reaction with ethylene. Accordingly, the composition of the present invention may be used for ethylene monitoring. Thus, as a film or in some other form, the composition of the present invention can be used to indicate ethylene being generated within or passing into a container. Such films might also offer a basis for measuring the permeability of other films to ethylene and similar compounds, using devices similar to those described in Australian patent No. 548020 for measuring oxygen permeability.

Figure 2:
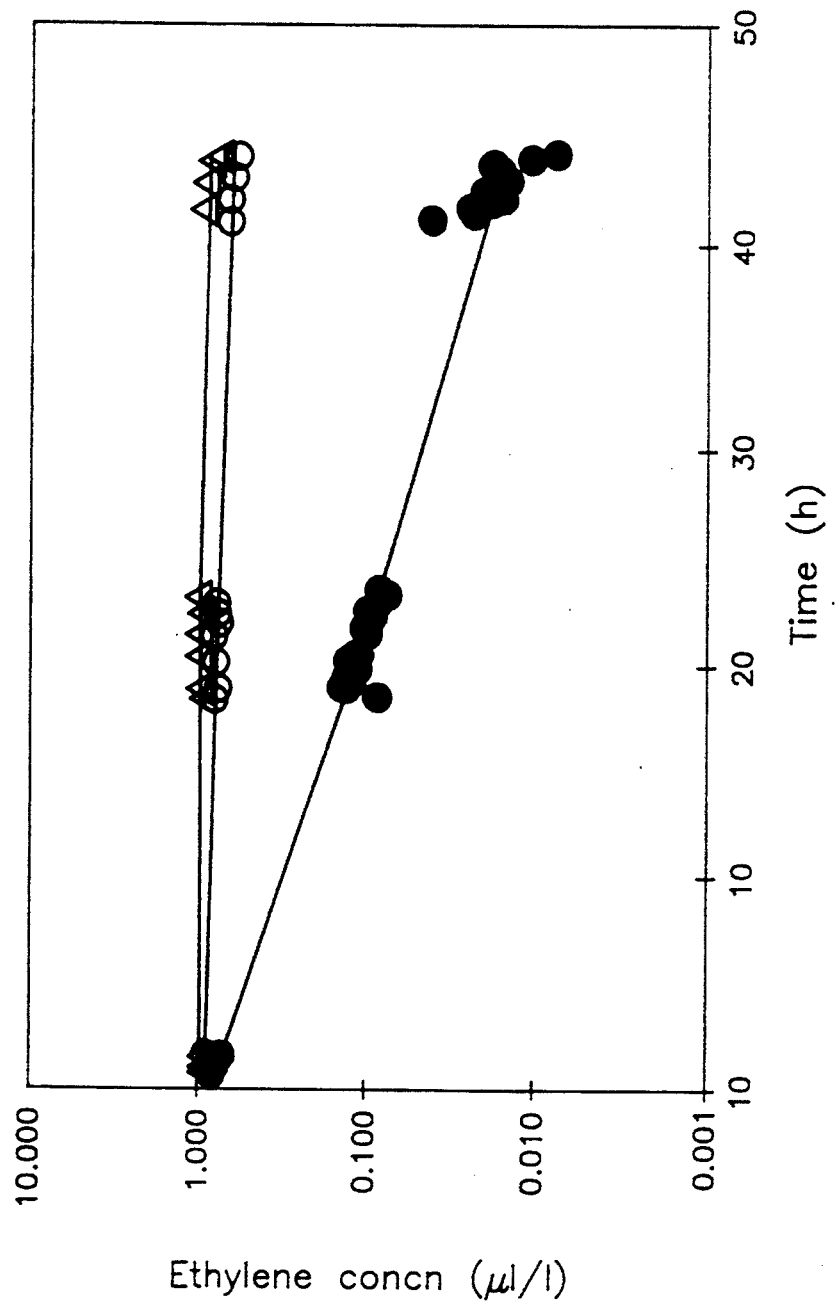

In order that the nature of the present invention may be more clearly understood, preferred forms thereof will now be described with reference to the following examples and following figures in which:

FIG. 1 shows the results obtained in Example 2 (PS099 film without tetrazine dicarboxyoctyl ester ····o···o···; PSO99 film with tetrazine dicarboxyoctyl ester —●——●—); and FIG. 2 shows the results obtained in Example 3 (PS099 film without tetrazine dicarboxyoctyl ester o  o ; "Green Bag" ▲▲; PS099 film with tetrazine dicarboxyoctyl ester —●——●— ).

EXAMPLE 1

Ethylene-Sensitive Film Preparation 4.00 g PS099 and 0.0716 g tetrazine dicarboxyoctyl ester, dissolved in 12 ml and 3 ml chloroform respectively were mixed and diluted to 20 ml with chloroform. The mixture was cast on a mylar-lined glass plate using a TLC spreader with a doctor blade gap of 300 $\mu$m to give a final film of 40–50 $\mu$m thickness.

EXAMPLE 2

Extending the Life of Cut Flowers

Carnations (cv Lena) were picked from a commercial nursery in the morning and divided between two treatments, with five blooms in each treatment. After recutting the stems, each treatment was placed in 300 ml water containing 30 $\mu$l commercial bleach, in Erlenmeyer flasks. The bunches (85 g fresh weight each) were then placed in separate 10.5 l chromatography jars which were sealed hermetically. Sealed with each treatment was a 20×20 cm film of 50 $\mu$m thick PS099 plastic. In one jar the film contained 0.05M concentration of tetrazine dicarboxyoctyl ester (total tetrazine dicarboxyoctyl ester—100 $\mu$moles), while no additive was included in the control film used in the other jar. The humidity within both jars was controlled around 90% rh to prevent condensation, and carbon dioxide was removed with a 5 g sachet of calcium hydroxide. The air within the jars was stirred continuously with a magnetic flea. The two jars were placed side by side in a room maintained at 20° C.

Initially 1.05 $\mu$l ethylene gas was added to each jar through an injection port. After 17 hours, an additional 1.05 $\mu$l ethylene gas was added. The concentration of ethylene within the jars was monitored over the four days of the experiment. Before opening the jars the level of oxygen and carbon dioxide was measured.

RESULTS

The results obtained are shown in FIG. 1.

The two additions of ethylene initially brought the ethylene concentrations within the jars to about 0.2 $\mu$l per liter. In the jar containing tetrazine dicarboxyoctyl ester, the ethylene level fell to 0,015 $\mu$l per liter within four days. The ethylene level in the control jar rose from the time ethylene was first admitted and after four days had reached a concentration of 15 $\mu$l per litre.

After four days oxygen and carbon dioxide concentration in the control jar were 12% and 2% respectively, and in the ethylene-depleted jar 15% and 0.08% respectively.

When the flowers were removed after four days and placed at 20° C. in water, the petals of the control flowers quickly became water-soaked. Over a further three days they lost all turgor and dried out. By contrast, flowers from the ethylene-depleted jar were in good condition and this was maintained for several days.

At the end of the experiment, the tetrazine dicarboxyoctyl ester containing film still had the characteristic pink color, which indicated that the ethylene-removing capacity had not been exhausted.

EXAMPLE 3

An experiment was conducted to compare the ability of the composition of the present invention to remove ethylene with that of normal film and a commercial ethylene scouring film known as "Green Bag".

Sealed in jars having an initial ethylene concentration of 10 $\mu$l/l were 49 cm$^2$ patches of one of three films: PS099 film with no additive as a control; PS099 film having a thickness of 35 $\mu$m and containing tetrazine dicarboxyoctyl ester at a concentration of approximately 0.13M; and "Green Bag". The jars were maintained at 20° C. and the concentration of ethylene in the jars measured over 40 hours. The results of this experiment are shown in FIG. 2.

As is shown in FIG. 2 the control film and "Green Bag" were roughly equivalent in their ability to remove ethylene. In contrast, the film including tetrazine dicarboxyoctyl ester resulted in a ten-fold reduction in the amount of ethylene present after twenty hours and an approximate hundred-fold reduction in ethylene concentration after forty hours.

These results demonstrate that the composition of the present invention is very efficient in removing ethylene from an ambient atmosphere.

The film containing tetrazine dicarboxyoctyl ester after forty hours still had the characteristic pink color which indicated that the ethylene-removing capacity of the film had not been exhausted.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A composition for absorbing gaseous unsaturated compounds comprising a tetrazine having electron withdrawing substituent incorporated in an ethylene permeable substrate such that upon exposure to ethylene, the said tetrazine reacts with ethylene rapidly and irreversibly.

2. A composition as claimed in claim 1 in which the electron withdrawing substituent(s) is a fluorinated alkyl group, sulfone and/or ester group, the ester group being selected from the group consisting of dicarboxyoctyl, and dicarboxymethyl.

3. A composition as claimed in claim 2, wherein tetrazine is tetrazine dicarboxyoctyl ester.

4. A composition as claimed in claim 1 in which the ethylene-permeable substrate is hydrophobic.

5. A composition as claimed in claim 4 in which the ethylene-permeable substrate is a hydrophobic polymeric material which will not absorb water and does not contain hydroxyl groups.

6. A composition as claimed in claim 5 in which the ethylene-permeable substrate is selected from the group consisting of silicon carbonates, polystyrenes, polyethylenes and polypropylenes.

7. A composition as claimed in claim 6 in which the ethylene-permeable substrate is a 50:50 block copolymer of dimethyl siloxane and bisphenol A carbonate.

8. A composition as claimed in claim 1 in which the composition is cast as a thin film suitable for wrapping and packaging.

9. A method of retarding the ripening or senescence of fruit and other plant material comprising confining the fruit or plant material in an ambient atmosphere subject to the ethylene-absorbing action of the composition as claimed in claim 1.

10. A packaging material for retarding the ripening or senescence of fruit or other plant material comprising an ethylene permeable substrate wherein a composition for absorbing gaseous unsaturated compounds comprising tetrazine having an electron withdrawing substituent is incorporated therein; such that upon exposure to ethylene, the tetrazine reacts with ethylene rapidly and irreversibly.

11. A packaging material according to claim 10, wherein the electron withdrawing substituent is a fluorinated alkyl group, sulfone and/or ester group, the ester being selected from a group consisting of dicarboxyoctyl and dicarboxymethyl.

12. A packaging material according to claim 11, wherein the tetrazine is tetrazine dicarboxyoctyl ester.

13. A packaging material according to claim 10, wherein the ethylene permeable substrate is hydrophobic.

14. A packaging material according to claim 13, wherein the ethylene permeable substrate is a hydrophobic polymeric material which will not absorb water and does not contain hydroxyl groups.

15. A packaging material according to claim 14, wherein the ethylene permeable substrate is selected from the group consisting of silicon carbonates, polystyrenes, polyethylenes and polypropylenes.

16. A packaging material according to claim 15, wherein the ethylene permeable substrate is a 50:50 block copolymer of dimethyl siloxane and bisphenol A carbonate.

* * * * *